(12) United States Patent
Karuppanchetty et al.

(10) Patent No.: US 10,794,203 B2
(45) Date of Patent: Oct. 6, 2020

(54) SCAVENGE TUBE FOR A GAS TURBINE ENGINE

(71) Applicant: General Electric Company, Schenectady, NY (US)

(72) Inventors: Sivaprakaash Karuppanchetty, Bangalore (IN); Suresh Nukala Kumar, Bangalore (IN); Robert Proctor, Mason, OH (US)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 15/466,078

(22) Filed: Mar. 22, 2017

(65) Prior Publication Data
US 2018/0274379 A1    Sep. 27, 2018

(51) Int. Cl.
*F01D 9/06* (2006.01)
*F01D 25/18* (2006.01)
*F02C 7/06* (2006.01)

(52) U.S. Cl.
CPC ............. *F01D 9/065* (2013.01); *F01D 25/18* (2013.01); *F02C 7/06* (2013.01); *F05D 2220/32* (2013.01); *F05D 2240/50* (2013.01); *F05D 2250/60* (2013.01); *F05D 2260/98* (2013.01)

(58) Field of Classification Search
CPC ............. F01D 9/065; F01D 25/18; F02C 7/06
See application file for complete search history.

(56) References Cited

U.S. PATENT DOCUMENTS

| 3,154,141 | A | * | 10/1964 | Huet | F28F 1/12 165/133 |
|---|---|---|---|---|---|
| 3,242,558 | A | * | 3/1966 | Selig | F01N 13/185 29/890.08 |
| 4,451,966 | A | * | 6/1984 | Lee | F28D 7/103 138/114 |
| 4,585,059 | A | * | 4/1986 | Lee | F28D 7/106 138/113 |
| 5,375,654 | A | * | 12/1994 | Hougland | F28F 13/12 138/38 |
| 5,471,966 | A | * | 12/1995 | Feuling | F01M 13/04 123/572 |
| 5,489,190 | A | * | 2/1996 | Sullivan | F01D 25/18 184/6.11 |
| 5,495,873 | A | * | 3/1996 | Butkiewicz | F01N 13/102 138/114 |
| 5,839,505 | A | * | 11/1998 | Ludwig | F28D 1/0477 165/109.1 |
| 6,412,820 | B1 | * | 7/2002 | Erps | F16L 19/005 285/123.1 |
| 6,438,938 | B1 | * | 8/2002 | Burkholder | F01D 9/065 184/6.11 |

(Continued)

Primary Examiner — Michael A Riegelman
(74) Attorney, Agent, or Firm — Dority & Manning, P.A.

(57) ABSTRACT

A scavenge tube for conveying oil within an engine. The scavenge tube includes an outer tube and an inner tube. The outer tube defines a first surface and the inner tube defines a second surface. The inner tube is configured to be fluidly connected to a source for oil. A space that is defined between the outer tube and the inner tube such that the first surface opposes the second surface. A plurality of bumps is positioned within the space such that each bump extends from one of the first surface and the second surface and extends toward the opposing surface.

15 Claims, 6 Drawing Sheets

(56) References Cited

U.S. PATENT DOCUMENTS

| | | | |
|---|---|---|---|
| 6,920,917 B2* | 7/2005 | Inoue | F28D 7/106 165/154 |
| 7,011,150 B2* | 3/2006 | Komatsubara | F28F 1/42 165/177 |
| 7,191,824 B2* | 3/2007 | Wu | F02B 29/0462 165/141 |
| 7,984,752 B2* | 7/2011 | Yusa | F28D 7/106 165/141 |
| 8,459,342 B2* | 6/2013 | O'Donnell | F24H 3/087 165/109.1 |
| 9,091,487 B2* | 7/2015 | Byon | F28D 7/106 |
| 9,897,387 B2* | 2/2018 | Glass | F28D 7/0066 |
| 10,180,206 B2* | 1/2019 | Jackson | F16L 59/12 |
| 2008/0116009 A1* | 5/2008 | Sheridan | F01D 25/18 184/6.4 |
| 2009/0133581 A1* | 5/2009 | Fang | B01D 45/14 96/216 |
| 2014/0076661 A1* | 3/2014 | Xu | F16N 17/06 184/6 |
| 2015/0096839 A1* | 4/2015 | Craig | F02C 7/06 184/6.1 |
| 2018/0231026 A1* | 8/2018 | Namadevan | F04D 29/083 |
| 2018/0274379 A1* | 9/2018 | Karuppanchetty | F01D 9/065 |
| 2019/0218913 A1* | 7/2019 | Sen | F01D 5/084 |

* cited by examiner

SCAVENGE TUBE FOR A GAS TURBINE ENGINE

BACKGROUND OF THE INVENTION

The present invention relates to gas turbine engines, and more particularly, to an oil scavenging apparatus for such engines.

A gas turbine engine includes one or more shafts which are mounted for rotation in several bearings, usually of the rolling-element type. The bearings are enclosed in enclosures called "sumps" which are pressurized and provided with an oil flow for lubrication and cooling. Oil scavenge tubes are used to move scavenge oil from a sump back into the oil circulation system. The tubes are typically located within struts that are part of the turbine rear frame, and as a result, they are exposed to a high heat load due to the high temperature air that is circulating inside the rear frame to avoid the turbine punch load.

One problem with prior art scavenge tubes is that they are configured such that oil adheres to one side of the tube due to jet formation at tube inlet. Another problem is that spacers, i.e., standoffs, within scavenge tubes conduct heat to the oil. As a result, oil droplets that accumulate on the unused side are exposed to higher temperature for longer duration. Therefore there is a need for a scavenge tube configured such that oil flows throughout the scavenge tube and conduction of heat from air surrounding the strut to the oil is minimized.

BRIEF DESCRIPTION OF THE INVENTION

This problem is addressed by a scavenge tube incorporating spacers configured as bumps to provide minimal area for heat transfer to oil and diffusers configured at the inlet of the tubes to guide oil such that it evenly flows through the scavenge tube.

According to one aspect of the technology described herein there is provided a scavenge tube for conveying oil within an engine. The scavenge tube includes an outer tube and an inner tube. The outer tube defines a first surface and the inner tube defines a second surface. The inner tube is configured to be fluidly connected to a source for oil. A space is defined between the outer tube and the inner tube such that the first surface opposes the second surface. A plurality of humps is positioned within the space such that each bump extends from one of the first surface and the second surface and extends toward the opposing surface.

BRIEF DESCRIPTION OF THE DRAWINGS

The invention may be best understood by reference to the following description, taken in conjunction with the accompanying drawing figures in which.

DETAILED DESCRIPTION OF THE INVENTION

Figure 1:
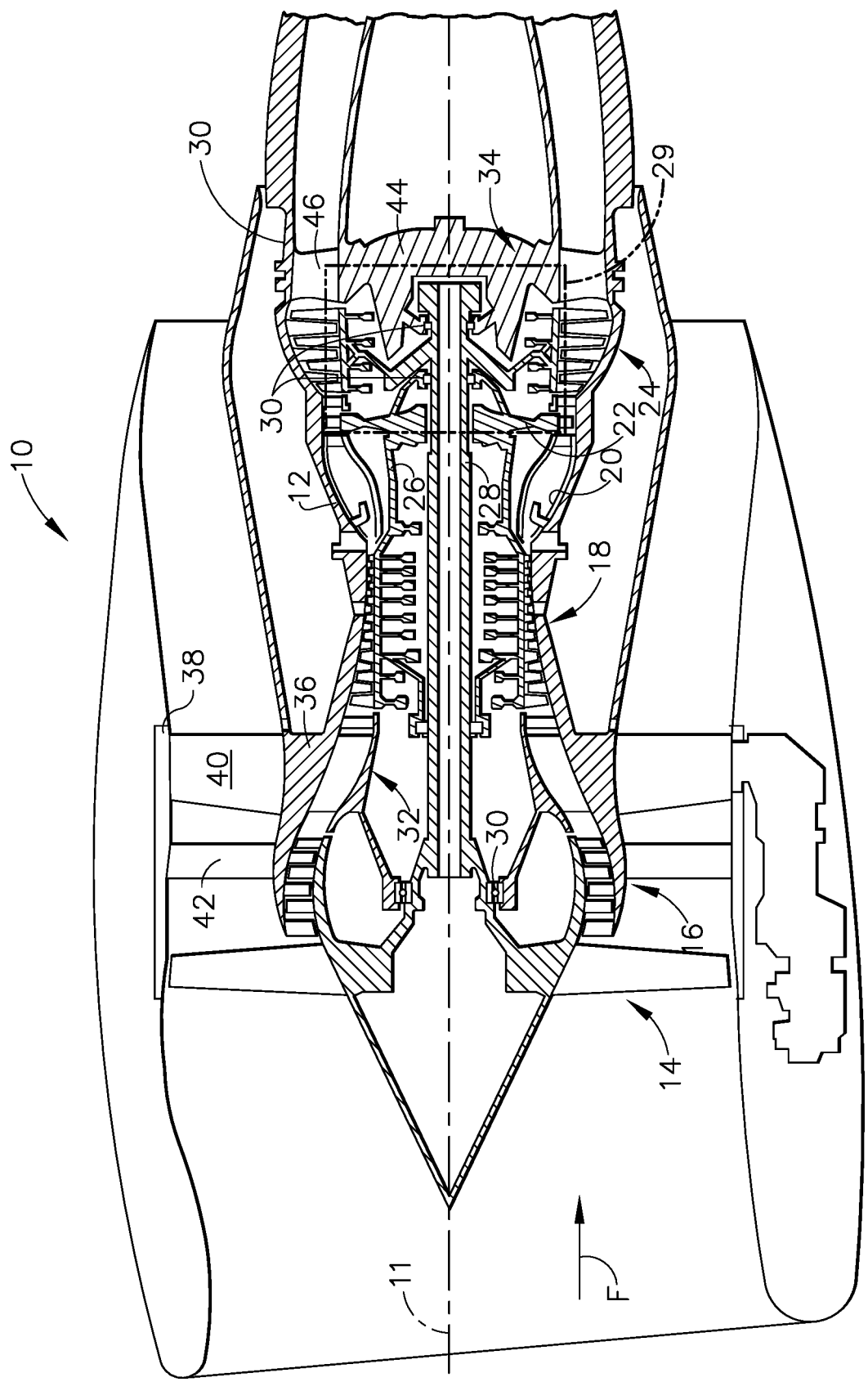
FIG. 1 is a schematic half-sectional view of an exemplary gas turbine engine.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc. The engine 10 has a longitudinal center line or axis 11 and an outer stationary annular core casing 12 disposed concentrically about and coaxially along the axis 11.

It is noted that, as used herein, the terms "axial" and "longitudinal" both refer to a direction parallel to the centerline axis 11. While "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in art air flow passing through or around a component. The direction of this flow is shown by the arrow "F" in FIG. 1. These directional terms are used merely for convenience in description and do not require a particular orientation of the structures described thereby.

The engine 10 has a fin 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 14 and booster 16 via an inner shaft 28. The inner and outer shaft 28 and 26 are rotatably mounted in bearings 30 which are themselves mounted in a fan frame 32 and a turbine rear frame 34. The bearings 30 are positioned within sumps. More specifically, the bearings 30 that are mounted in the rear frame 34 are mounted within a sump 29 as shown by dashed lines.

The fan frame 32 includes a central hub 36 connected to an annular fan casing 38 by an annular array of radially extending struts 40. An annular array of fan outlet guide vanes ("OGVs") 42 extend across the fan flow path just downstream of the fan 14. In this example, the OGVs 42 are aero-turning elements and the struts 40 serve as structural supports for the in casing 38. The turbine rear frame 34 has a central hub 44 connected to the core casing 12 by an annular array of radially-extending struts 46.

Figure 2:
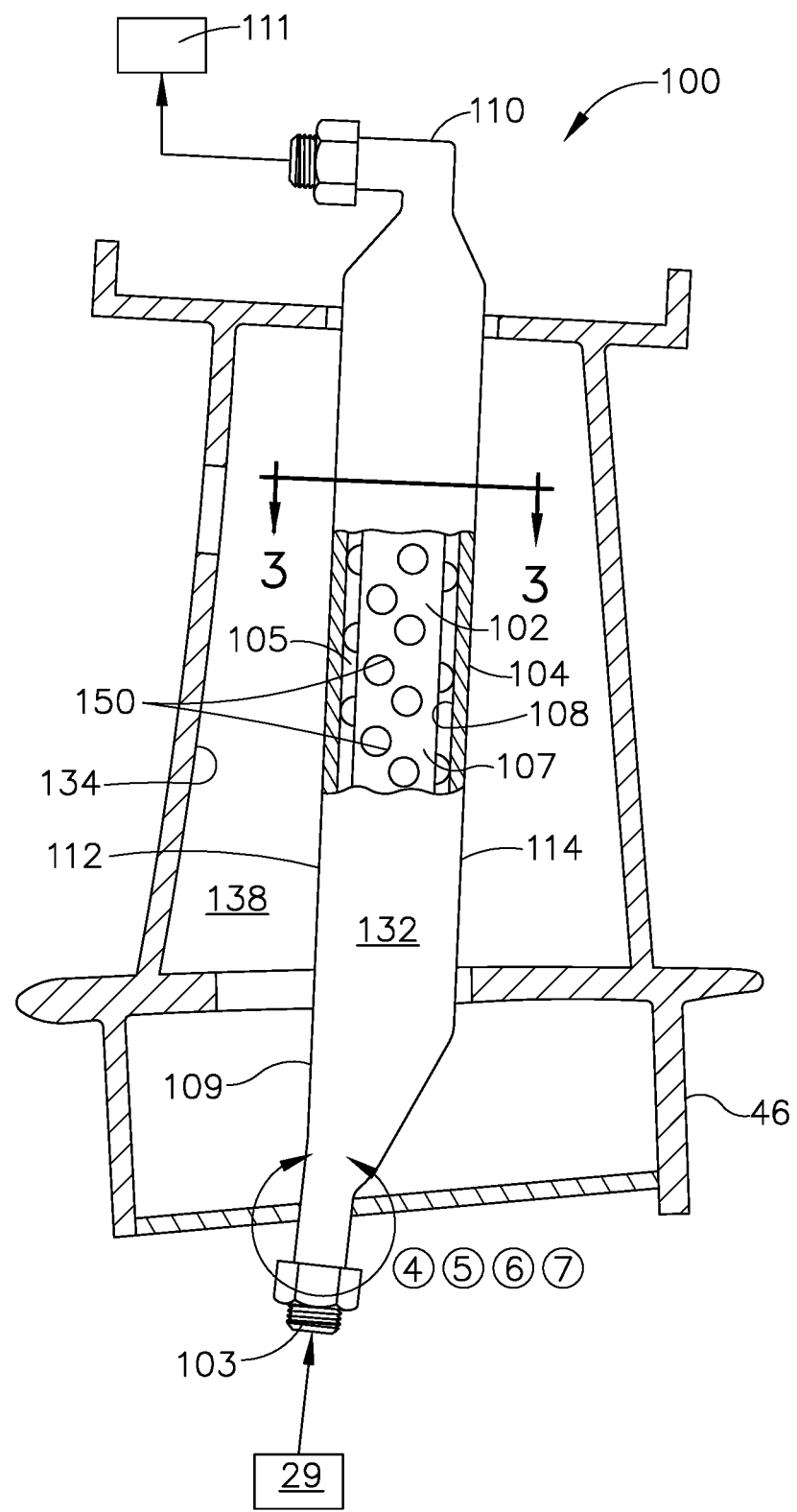
FIG. 2 is a schematic part sectional view of a scavenge tube of the gas turbine engine of FIG. 1.
Figure 3:
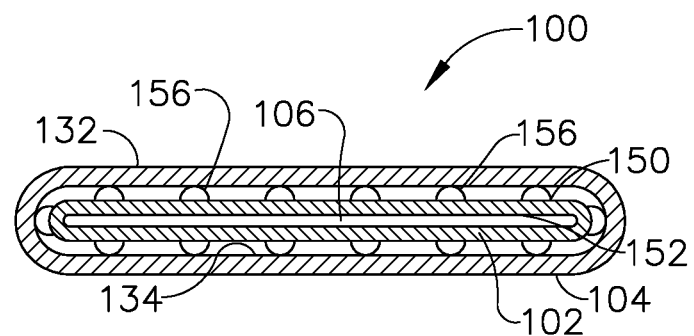
FIG. 3 is a cross-sectional view of the scavenge tube shown in FIG. 2.

Referring to FIG. 2, there is an oil scavenge tube denoted 100 and located within a strut 46. A cross-sectional view of a representative oil scavenge tube 100 is shown in FIG. 3. The oil scavenge tube 100 has an inner tube 102 and an outer tube 104 that are spaced-apart such that a space 105 is defined between them. The inner tube 102 defines a conduit 106 for fluid such as oil. As used herein, the term "conduit"

refers to a space through which a fluid such as oil can flow. A proximal end 109 of the oil scavenge tube 100 intersects the strut 46. The conduit 106 is fluidly connected to the sump 29 via an inner port 103 near the proximal end 109. A distal end 110 of the oil scavenge tube 100 is fluidly connected to an oil flow circuit 111 for providing scavenge flow. By way of example and not limitation, the oil flow circuit can include a pump, pipe, reservoir, valve, sump, and a combination thereof. In this manner the scavenge tube 100 provides a flowpath for oil or an oil/air mixture being scavenged from the sump 29 through the port 103 and the conduit 106 to the oil flow circuit 111.

Referring now to FIGS. 2 and 3, the scavenge tube 100 has a leading edge 112 and a trailing edge 114 and passes through the strut 46. The outer tube 104 has an outer surface 132 that opposes an inner surface 134 of the strut 46. Together, the outer surface 132 and the inner surface 134 of the strut 46 define a plenum 138. As used herein, the term "plenum" refers to a region that is configured to conduct air through it.

Figure 9:
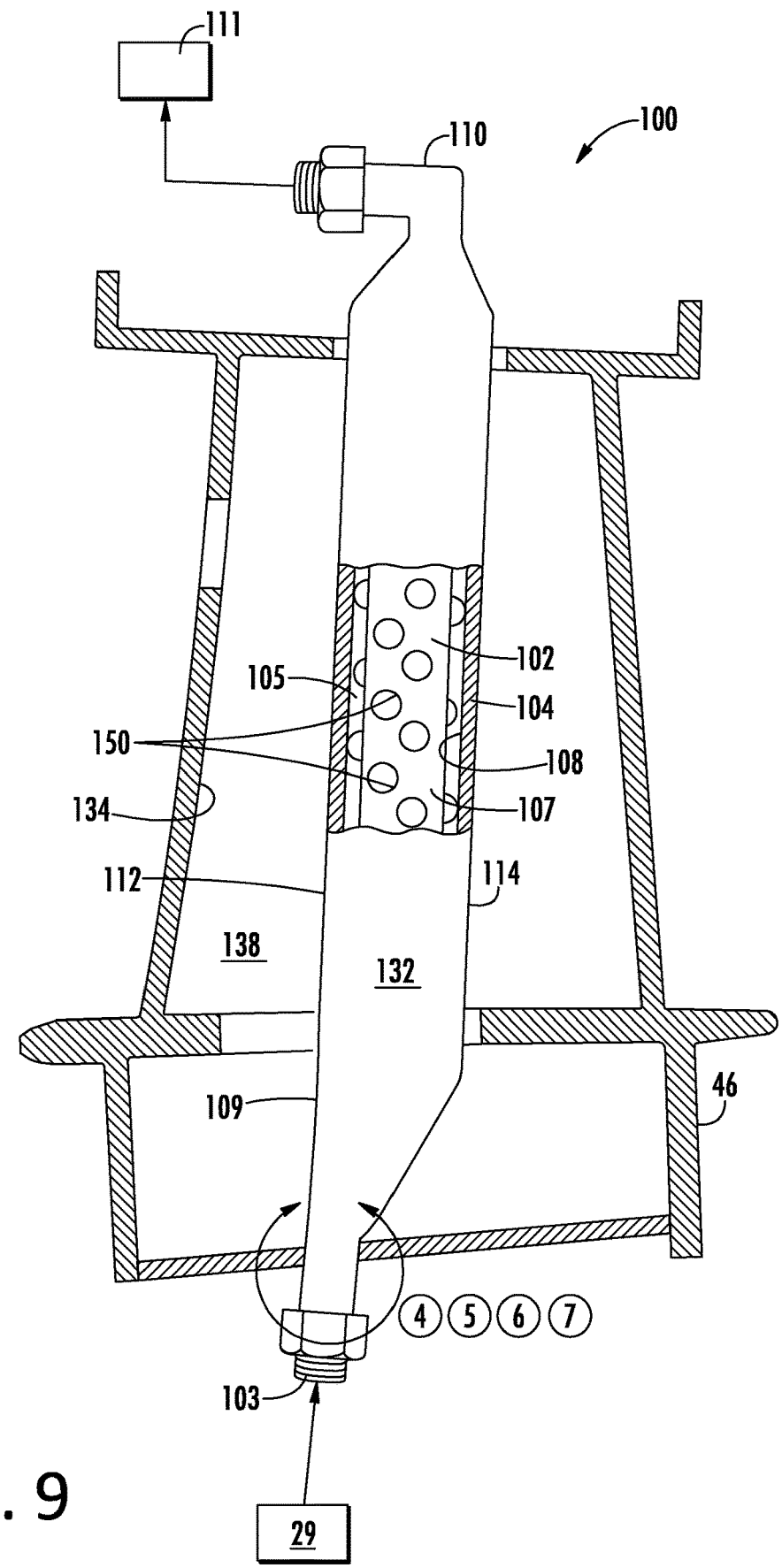
FIG. 9 is a schematic part sectional view of a scavenge tube of the gas turbine engine of FIG. 1 according to one or more embodiments of the present invention.

A plurality of bumps 150 are positioned within the space 105 of the scavenge tube 100. According to the illustrated embodiment, each bump of the plurality of bumps 150 has a base 152 and a highpoint 156. The base of each bump 150 is positioned on the first, outer surface 107 of the inner tube 102 and defines a contact area 154 there. In some embodiments, at least one of the bumps 150 is positioned on the second, inner surface 108 of the outer tube 104; as shown in FIG. 9, in some embodiments all of the bumps 150 are positioned on the inner surface 108 of the outer tube 104.

Figure 10:
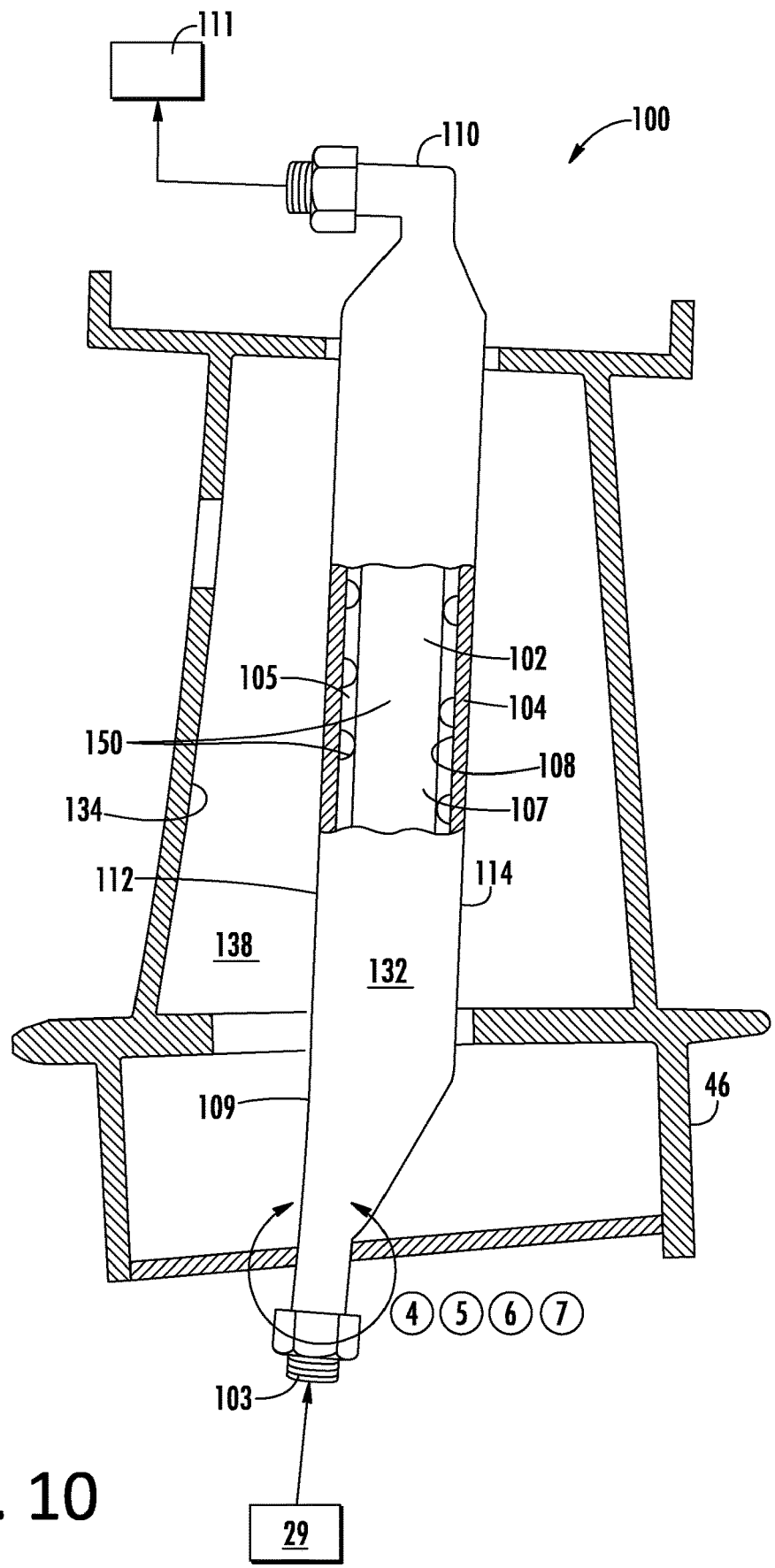
FIG. 10 is a schematic part sectional view of a scavenge tube of the gas turbine engine of FIG. 1 according to one or more embodiments of the present invention.

Each bump 150 extends away from its base 152 toward its high point 156 and the opposing surface, i.e. either outer surface 107 or inner surface 108. The highpoint 156 is configured to be in contact with the opposing surface such that a contact area 157 is defined. In this manner a bump 150 is configured to provide spacing between the inner surface 108 and the outer surface 107 such that the inner tube 102 is spaced apart from the outer tube 104. In some embodiments, as shown in FIG. 10, not all of the bumps 150 are in contact with the opposing surface. And in some embodiments, none of the bumps 150 are in contact with the opposing surface.

The plurality of bumps 150 is arranged such that bumps 150 are distributed along the outer surface 107 such that each bump 150 is generally evenly spaced apart from neighboring bumps 150. The contact area 157 is very small and is less than the contact area 154. Thus there is hale area provided for the conduction of heat from the outer tube 104 to the inner tube 102 via the bumps 150. Thus the bumps 150 are configured to provide support between the inner tube 102 and the outer tube 104 while minimizing contact area between the two tubes and thus minimizing heat transfer from the outer tube 104 into the conduit 106 and the inner tube 102. By way of example and not limitation, the plurality of bumps 150 can be manufactured in accordance with one of the following processes: additive manufacturing, machining, stamping, welding, and a combination thereof.

Figure 4:
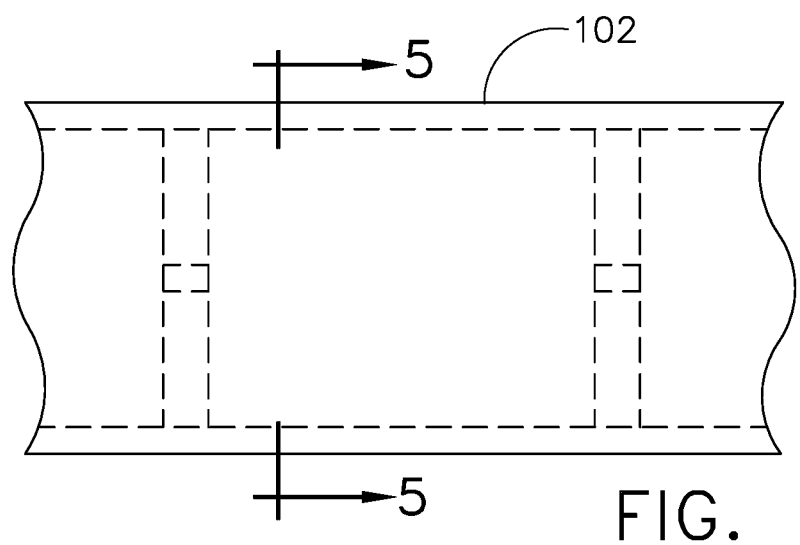
FIG. 4 is a front elevation view of a scavenge tube.
Figure 5:
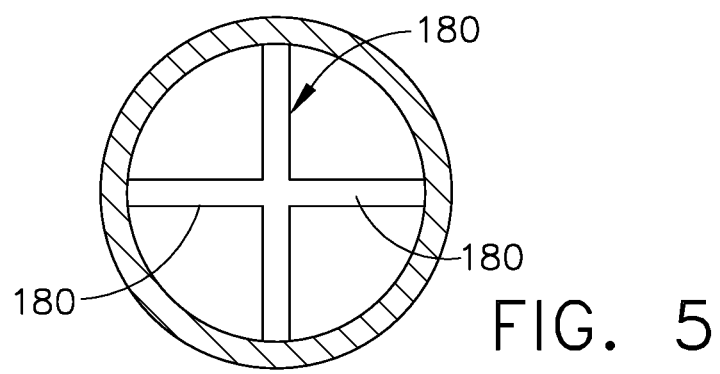
FIG. 5 is a side view of the scavenge tube of FIG. 4.
Figure 6:
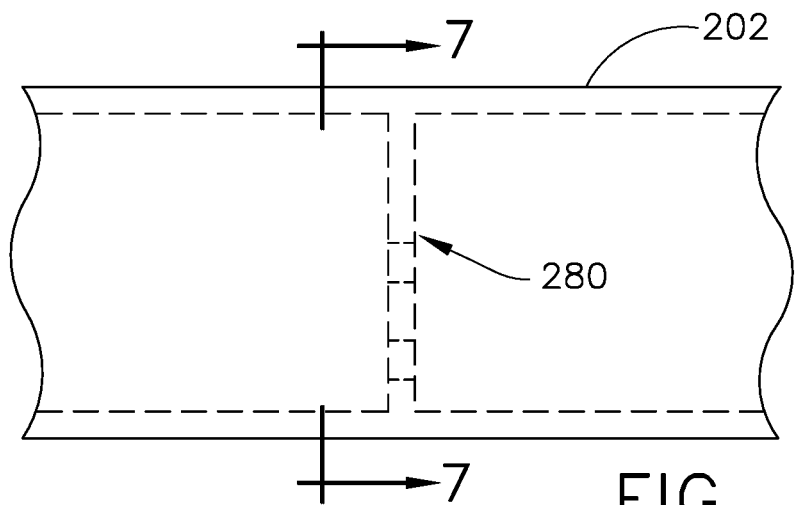
FIG. 6 is a front elevation view of another scavenge tube according to a different embodiment of the present invention.
Figure 7:
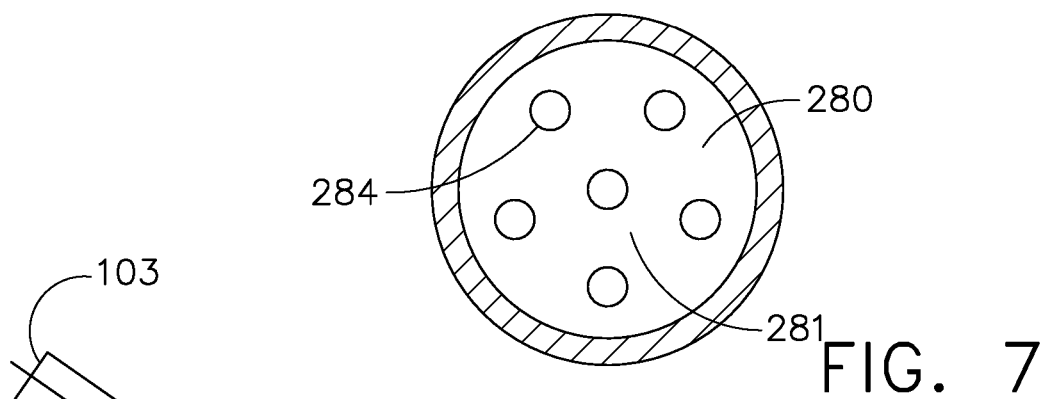
FIG. 7 is a side view of the scavenge tube of FIG. 6.
Figure 8:
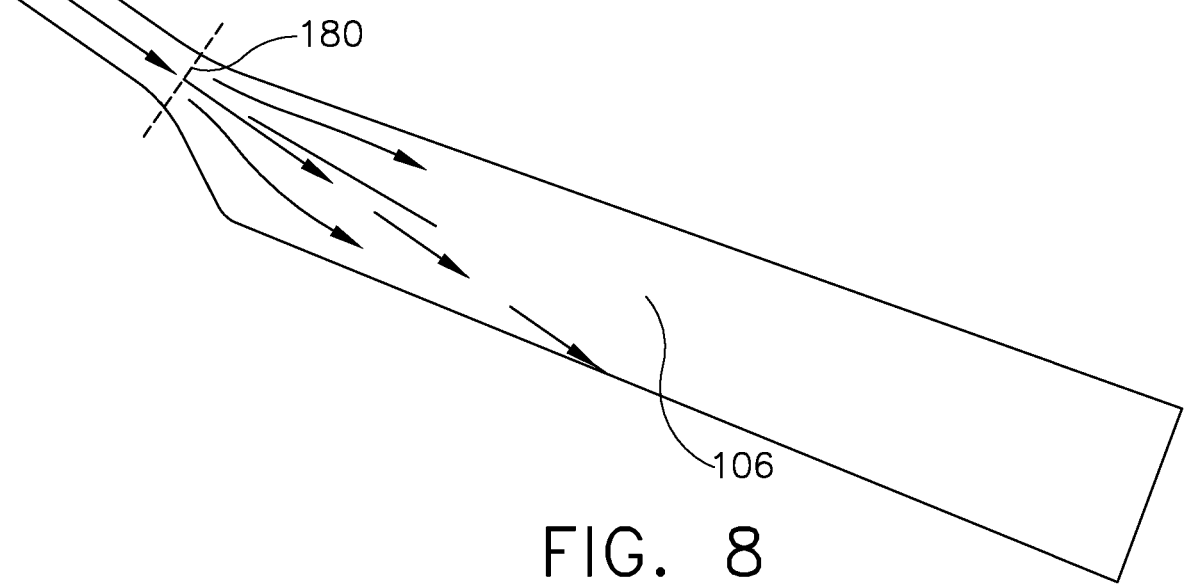
FIG. 8 is a schematic diagram showing flow of oil within a scavenge tube.

Referring now to FIGS. 4 and 5, the scavenge tube 100 includes a diffuser 180. The diffuser 180 is configured to evenly distribute oil entering into the conduit 106 such that the oil flow through the conduit 106 is heated a generally consistent temperature. The diffuser 180 includes multiple rods 182. The multiple rods 182 can also be crossbars or wires.

By way of example and not limitation, the inner tube 102 and the outer tube 104 are formed from one of the following materials: Inconel alloy, Titanium alloy, and a combination thereof invention.

The present invention can be better understood from the description of the operation thereof. The bumps 150 operate to maintain spacing of the inner tube 102 and the outer tube 104. The bumps 150 are also configured to minimize temperature transfer between the outer tube 104 and the inner tube 102.

Generally during operation of the engine 10, the air temperature within the plenum is between about 650° C. (about 1200° F.) and about 590° C. (about 11.00° F.). The temperature of oil within the conduit 106 is maintained at less than about 230° C. (about 450° F.) which is the coking temperature of a commonly used oil. It should be appreciated that the temperature of oil within the conduit 106 is maintained below the coking temperature of that oil.

According to one hypothetical example of temperatures during operation of the engine 10, the temperature of the outside surface of the strut 46 is about 631° C. (about 1167° F.). The temperature of the inside of the strut wall is about 627° C. (about 1160"F). The temperature of the scoop air traveling within the plenum 138 is about 621'C (about 1150° F.). The temperature of the outer surface 132 of the outer tube 104 is about 410° C. (about 770° F.). The temperature of the inner surface 10$ of the outer tube 104 is about 408° C. (about 767° F.). The temperature of the outer surface 107 of the inner tube 192 is about 199° C. (about 390° F.). The temperature of the inner surface of the inner tube 102 is about 196° C. (about 385° F.). The temperature of the oil within the conduit 106 according to this hypothetical example is about 149° C. (about. 300° F.).

According to an alternative embodiment, the diffuser 289 includes a perforated plate 281 that has a plurality of openings 284 formed therethrough.

The scavenge tube described above has several benefits compared to prior art designs. The bumps between the inner tube and the outer tribe provide structure for maintaining the spacing between the two tubes and minimize the area needed to conduct heat from outside of the outer tube into the inner tube. Thus less heat is conducted from air outside of the outer tube to the oil within the inner tube. Also, the diffuser positioned within the inner tube causes oil to flow evenly throughout the inner tube and thus avoids bare areas where splashes can overheat. In this manner coking is minimized relative to the prior art.

The foregoing has described a scavenge tube for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A scavenge tube for conveying oil within an engine, the scavenge tube comprising:
   an inner tube that defines a second surface and that is configured to be fluidly connected to a source of oil;
   an outer tube that defines a first surface;
   a space that is defined between the outer tube and the inner tube such that the first surface opposes the second surface; and
   a plurality of bumps positioned within the space,
   wherein each of the plurality of bumps has a flat base disposed on one of the first surface and the second surface, and extends radially from the flat base toward the other of the first surface and the second surface to a high point,
   wherein, for at least for one of the plurality of bumps, a first contact area is formed between the flat base and the one of the first surface and the second surface, and
   wherein, for at least for one of the plurality of bumps, a second contact area smaller than the first contact area is formed between the high point and the other of the first surface and the second surface.

2. The scavenge tube according to claim 1, wherein at least one of the plurality of bumps does not contact the other of the first surface and the second surface.

3. The scavenge tube according to claim 1, wherein all of the plurality of bumps contact the other of the first surface and the second surface.

4. The scavenge tube according to claim 1, wherein the base is generally circular.

5. The scavenge tube according to claim 1, wherein all of the plurality of bumps extend from the first surface.

6. The scavenge tube according to claim 1, wherein all of the plurality of bumps extend from the second surface.

7. The scavenge tube according to claim 1,
   wherein the inner tube defines a conduit and a diffuser is positioned within the inner tube, and
   wherein the diffuser crosses the conduit.

8. The scavenge tube according to claim 7, wherein the diffuser includes a plate that extends at least partially across the inner tube and at least one opening is defined through the plate.

9. The scavenge tube according to claim 8, wherein a plurality of openings is defined through the plate.

10. The scavenge tube according to claim 7, wherein the diffuser includes a plurality of crossbars that each extend across the inner tube through the interior space of the inner tube.

11. A gas turbine engine for an aircraft, the engine comprising:
    a strut; and
    a scavenge tube positioned within the strut comprising:
       an outer tube that defines an inner surface; and
       an inner tube that defines an outer surface,
    wherein the inner surface and the outer surface are opposing surfaces, and
    wherein the inner tube is positioned within the outer tube and spaced apart from the outer tube such that a space is defined between the inner tube and the outer tube,
    wherein the inner tube is configured to convey oil between a source of oil and an oil flow circuit,
    wherein a plurality of bumps are positioned within the space, and
    wherein each of the plurality of bumps is positioned on one of the inner surface and the outer surface,
    wherein each of the plurality of bumps has a flat base disposed on the one of the inner surface and the outer surface and extends radially from the flat base toward the other of the inner surface and the outer surface to a high point,
    wherein, for at least for one of the plurality of bumps, a first contact area is formed between the flat base and the one of the inner surface and the outer surface, and
    wherein, for at least for one of the plurality of bumps, a second contact area smaller than the first contact area is formed between the high point and the other of the inner surface and the outer surface.

12. The engine according to claim 11, further comprising a diffuser that is positioned within the inner tube.

13. The engine according to claim 12, wherein the diffuser is a perforated plate.

14. The engine according to claim 13, wherein all of the plurality of bumps are positioned on the outer surface of the inner tube.

15. The engine according to claim 11, wherein the scavenge tube is configured such that oil within the inner tube of the scavenge tube is maintained at less than 450° F.

\* \* \* \* \*